United States Patent
Bychkov et al.

(10) Patent No.: US 7,664,987 B2
(45) Date of Patent: Feb. 16, 2010

(54) FLASH MEMORY DEVICE WITH FAST READING RATE

(75) Inventors: Eyal Bychkov, Hod Hasharon (IL); Sasha Paley, Kfar Saba (IL); Avraham Meir, Reshon Lezion (IL)

(73) Assignee: SanDisk IL Ltd., Kfar Saba (IL)

(*) Notice: Subject to any disclaimer, the term of this patent is extended or adjusted under 35 U.S.C. 154(b) by 602 days.

(21) Appl. No.: 10/851,745

(22) Filed: May 24, 2004

(65) Prior Publication Data

US 2004/0250177 A1    Dec. 9, 2004

Related U.S. Application Data

(60) Provisional application No. 60/473,437, filed on May 25, 2003.

(51) Int. Cl.
    *G06F 11/00* (2006.01)
(52) U.S. Cl. .................. 714/30; 714/42; 714/43; 714/49
(58) Field of Classification Search ............ 714/21, 714/49, 57, 761, 762, 818, 24, 30, 42, 43, 714/731, 732
    See application file for complete search history.

(56) References Cited

U.S. PATENT DOCUMENTS

| | | | |
|---|---|---|---|
| 4,757,445 A * | 7/1988 | Zolnowsky et al. ......... 712/207 |
| 5,396,504 A * | 3/1995 | Pack .......................... 714/755 |
| 5,404,485 A | 4/1995 | Ban |
| 5,742,623 A * | 4/1998 | Nuber et al. ................ 714/798 |
| 5,793,774 A * | 8/1998 | Usui et al. .................. 714/719 |
| 5,799,168 A | 8/1998 | Ban |
| 5,864,649 A * | 1/1999 | Shima ........................ 386/124 |
| 5,937,425 A | 8/1999 | Ban |
| 5,943,348 A * | 8/1999 | Ly .............................. 714/761 |
| 6,061,824 A * | 5/2000 | Mo et al. .................... 714/769 |
| 6,148,354 A | 11/2000 | Ban et al. |
| 6,154,866 A * | 11/2000 | Kawahara et al. .......... 714/755 |
| 6,574,420 B1 * | 6/2003 | Ueda et al. ................. 386/95 |
| 6,628,892 B2 * | 9/2003 | Tsumagari et al. ......... 386/95 |
| 6,725,321 B1 * | 4/2004 | Sinclair et al. ............. 711/103 |
| 7,020,798 B2 * | 3/2006 | Meng et al. ................ 714/6 |
| 7,117,387 B2 * | 10/2006 | Katsuragi et al. .......... 714/6 |

(Continued)

FOREIGN PATENT DOCUMENTS

WO    WO00/49488    8/2000

*Primary Examiner*—Joshua A Lohn
(74) *Attorney, Agent, or Firm*—Martine Penilla & Gencarella, LLP (57) ABSTRACT

A method of sending data from a memory to a host, and a data storage device that uses the method. The controller of the data storage device sends the data directly from the memory to a buffer in an interface to the host while simultaneously checking the data for errors. If sufficiently few errors are found, the data are sent from the buffer to the host. Otherwise, the data are corrected, the data in the buffer are replaced with the corrected data, and the corrected data are written to the memory. If the data are stored by segments, the simultaneous sending and checking is effected segmentwise. When a bad segment is found, an error flag is set. When all the data have been sent and checked, or when the buffer is full, if the error flag has not been set, the data in the buffer are sent to the host.

23 Claims, 5 Drawing Sheets

U.S. PATENT DOCUMENTS

| | | | |
|---|---|---|---|
| 7,149,930 B2 * | 12/2006 | Ogawa et al. | 714/42 |
| 2002/0027731 A1 * | 3/2002 | Arakawa et al. | 360/53 |
| 2003/0093744 A1 * | 5/2003 | Leung et al. | 714/763 |
| 2003/0145274 A1 * | 7/2003 | Hwang et al. | 714/799 |
| 2004/0156251 A1 * | 8/2004 | Shiota et al. | 365/200 |
| 2004/0187065 A1 * | 9/2004 | Hwang et al. | 714/762 |
| 2004/0243885 A1 * | 12/2004 | James et al. | 714/42 |
| 2005/0078584 A1 * | 4/2005 | Yang | 369/53.35 |

* cited by examiner

FLASH MEMORY DEVICE WITH FAST READING RATE

This is a continuation-in-part of U.S. Provisional Patent Application No. 60/473,437, filed May 25, 2003

FIELD AND BACKGROUND OF THE INVENTION

The present invention relates to flash memory, and in particular to flash storage devices that include a flash controller.

Flash memory has become a popular non-volatile memory for a variety of applications, because it offers a superior cost-performance ratio. The well-known drawback of flash memory is its error rate, which is customarily overcome by adding a flash controller that is programmed to manage error correction. Thus, when a sector of data is written onto the flash memory, an additional amount of information, calculated with respect to the content of the data sector, is added, to allow recovery from errors. Using typical error-correction algorithms, 6 bytes of such extra data, called 'error correction code' (ECC), allows recovery from two faulty bits within a 512-byte sector. Then it is common to run all data read from a flash memory through the flash controller to identify and correct errors. Usually, errors are not just corrected on their way from the controller toward a target device, but the corrected data is also written back onto the flash memory to restrain the accumulation of errors.

Checking and correcting all data read from a flash memory is critical for many applications, but also slows down the data transfer process, because of the extra processing done by the flash controller. It is therefore desirable to find a method and design to reduce this extra delay to a minimum, without compromising the quality of error correction.

SUMMARY OF THE INVENTION

An object of the present invention is to provide systems and functionalities for providing error detection and correction to data read from a flash storage device while minimizing the delay caused by the associated processing.

The present invention is based on concurrently buffering and checking data sectors read from the flash memory, until the buffer is filled-up. If one or more bad sectors are encountered during the process, these sectors are corrected, the corrected data is written back onto the flash memory, and the current buffer is flagged as a bad buffer. When completing reading the buffer-equivalent amount of data from the flash memory, if the buffer has been flagged bad, the same data are reread, but now with a high probability to be found valid because they have passed a complete error correction cycle at the flash source. On the other hand, if the buffer content has been found valid, the buffer content are transferred to the target device, and the next group of data sectors then are read, copied to the buffer and checked by the flash controller.

When errors are relatively rare, as is the situation with current flash technology, there will be very few occasions of bad buffers, thus the great majority of data will be transferred and checked concurrently, minimizing the delay caused by the prior art methods where the transfer and checking processes are serial.

Therefore, according to the present invention there is provided a method of sending data from a memory to a host, including the step of: (a) substantially simultaneously: (i) sending the data from the memory to an interface with the host; and (ii) checking the data for errors.

Furthermore, according to the present invention there is provided a method of sending data from a memory to a host, the data being stored in a plurality of segments of the memory, the method including the steps of: (a) for each segment: substantially simultaneously: (i) sending the data from the each segment to a buffer; and (ii) checking the data from the each segment for errors.

Also according to the present invention there is provided a data storage device, including: (a) a memory for storing the data; (b) at least part of an interface to a host: and (c) a controller operative to substantially simultaneously: (i) send the data from the memory to the interface, and (ii) check the data for errors.

Also according to the present invention there is provided a method of sending data from a memory to a host, including the steps of: (a) sending the data from the memory to a buffer; (b) checking the data for errors; and (c) if a number of the errors that is found by the checking is at least as great as a predetermined threshold: (i) correcting the data, thereby providing corrected data, and (ii) replacing the data in the buffer with the corrected data.

Also according to the present invention there is provided a method of sending data from a memory to a host, the data being stored in a plurality of segments of the memory, the method including the steps of: (a) for each segment: (i) sending the data from each segment to a buffer, (ii) checking the data from the each segment for errors, and (iii) if a number of the errors that is found by the checking is at least as great as a predetermined threshold: setting an error flag.

Also according to the present invention there is provided a data storage device including: (a) a memory for storing the data; (b) at least part of an interface to a host; and (c) a controller operative: (i) to send the data from the memory to a buffer in the interface, (ii) to check the data for errors, and (iii) if a number of the errors that is found by the checking is at least as great as a predetermined threshold: (A) to correct the data, thereby providing corrected data, and (B) to replace the data in the buffer with the corrected data.

The present invention is directed towards methods for fast sending, to a host, of data stored in a memory, and towards a data storage device that employs the methods. Although the present invention is directed primarily towards the reading of data from a flash memory, the scope of the present invention extends to the reading of data from any memory to which the principles of the present invention are applicable.

Under the basic method of the present invention, the data are sent, preferably directly, from the memory to an interface with the host, while, substantially simultaneously, the data are checked for errors. Preferably, if the number of errors that are found in the course of the checking is at least as great as a predetermined threshold, then the data are corrected, thereby providing corrected data, and the corrected data are written to the memory. The corrected data also are sent to the interface, preferably directly to the interface. If the number of errors that are found in the course of the checking is less than the predetermined threshold, then the data are sent from the interface to the host.

In the case of a memory in which the data to be sent are stored in a plurality of segments (for example, in the sectors of a memory that is divided into sectors) and read from the memory segment by segment, the basic method of the present invention consists of, for each segment, sending the data stored in that segment, preferably directly, to a buffer, while, substantially simultaneously, checking the data stored in that segment for errors. Preferably, for each segment, if the number of errors that are found in the course of the checking is at least as great as a predetermined threshold, then the data stored in that segment are corrected, thereby providing corrected data; the corrected data are written to that segment; and an error flag is set. The data are sent directly from the segments to the buffer until either all the data have been sent to the buffer or the buffer is full. Then, if the error flag is set, the data are re-sent from the segments to the buffer, preferably directly to the buffer, and the error flag is cleared. If the error flag is not set, the data are sent from the buffer to the host.

A data storage device of the present invention includes a memory for storing the data, at least part of an interface to a host, and a controller for sending the data from the memory to the interface while substantially simultaneously checking the data for errors.

According to an alternative method of the present invention, the data are sent, preferably directly, to a buffer, and also are checked for errors. If the number of errors that are found in the course of the checking is at least as great as a predetermined threshold, the data are corrected, thereby providing corrected data, and the data in the buffer are replaced with the corrected data. Preferably, if the number of errors is less than the predetermined threshold, the data are sent from the buffer to the host; and if the number of errors is at least as great as the predetermined threshold, the corrected data are written to the memory. More preferably, the replacing of the data in the buffer with the corrected data is effected by sending the corrected data, most preferably directly, from the memory to the buffer.

In the case of a memory in which the data to be sent are stored in a plurality of segments and read from the memory segment by segment, the alternative method of the present invention consists of, for each segment, sending the data stored in that segment, preferably directly, to a buffer and checking the data for errors. If the number of errors that are found in the course of the checking is at least as great as a predetermined threshold, then an error flag is set. Preferably, for each segment, if the number of errors is at least as great as the predetermined threshold, then the data stored in that segment are corrected, thereby providing corrected data, and the corrected data are written to that segment. Preferably, the sending and the checking continue until either all the data have been sent to the buffer or the buffer is full. Then, if the error flag has been set, then the error flag is cleared, and the corrected data are sent, most preferably directly, from the segments to the buffer. Only if the error flag is already cleared (i.e., if the error flag has not been set) are the data sent from the buffer to the host.

An alternative data storage device of the present invention includes a memory for storing the data, at least part of an interface to a host, and a controller for sending the data from the memory to a buffer in the interface, for checking the data for errors, and for correcting the data and replacing the data in the buffer with the corrected data if the number of errors found in the data is at least as great as a predetermined threshold.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a method of sending data from a memory to a host, and of a data storage device that employs that method. Specifically, the present invention can be used to read data from a flash memory faster than according to the prior art.

The principles and operation of a data storage device according to the present invention may be better understood with reference to the drawings and the accompanying description.

Figure 1:
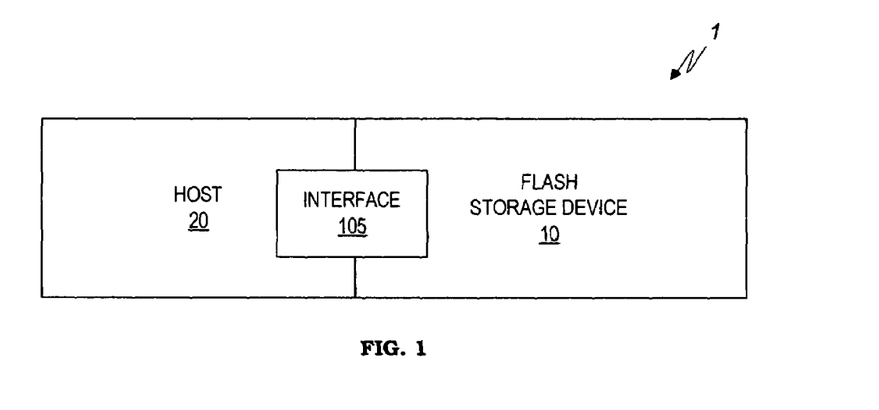
FIG. 1 is a conceptual illustration of a flash storage device interfaced with a host.

Referring now to the drawings, FIG. 1 illustrates the general layout of a data storage and processing system 1, whether according to the prior art or of the present invention. A flash storage device 10, incorporating a flash memory and a flash controller, is interfacing with a host device 20, which is a computerized device such as a personal computer, cellular telephone, digital camera or music player. Interface 105, such as USB or CompactFlash interface, is resident within both flash storage device 10 and host 20, to provide the necessary mechanical, electrical and logical interfaces to allow data transfer between the two devices.

Data transfer may involve read operations, i.e. data sent from flash storage device 10 to host 20, and/or write operations, i.e. data sent in the opposite direction. The present invention focuses on improving the speed of read operations, and therefore write operations are not described herein. It is presumed, however, that flash storage device 10 already stores data accompanied by ECC (error correction code) that allows error recovery under a selected error-correction algorithm known in the art.

Figure 2:
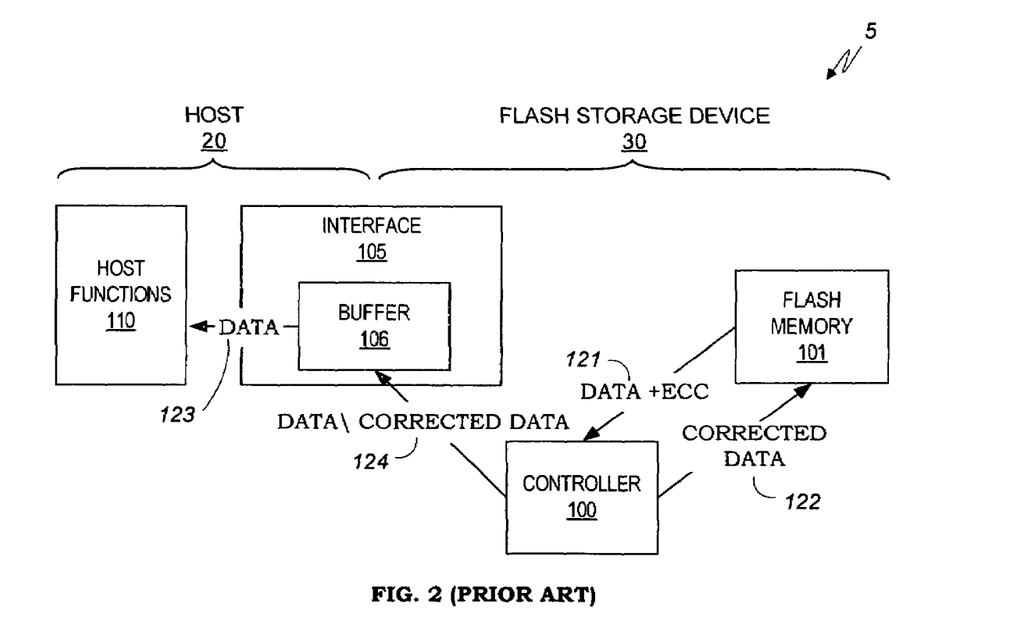
FIG. 2 is a high level conceptual block diagram of a prior art flash storage device interfaced with a host.
Figure 3:
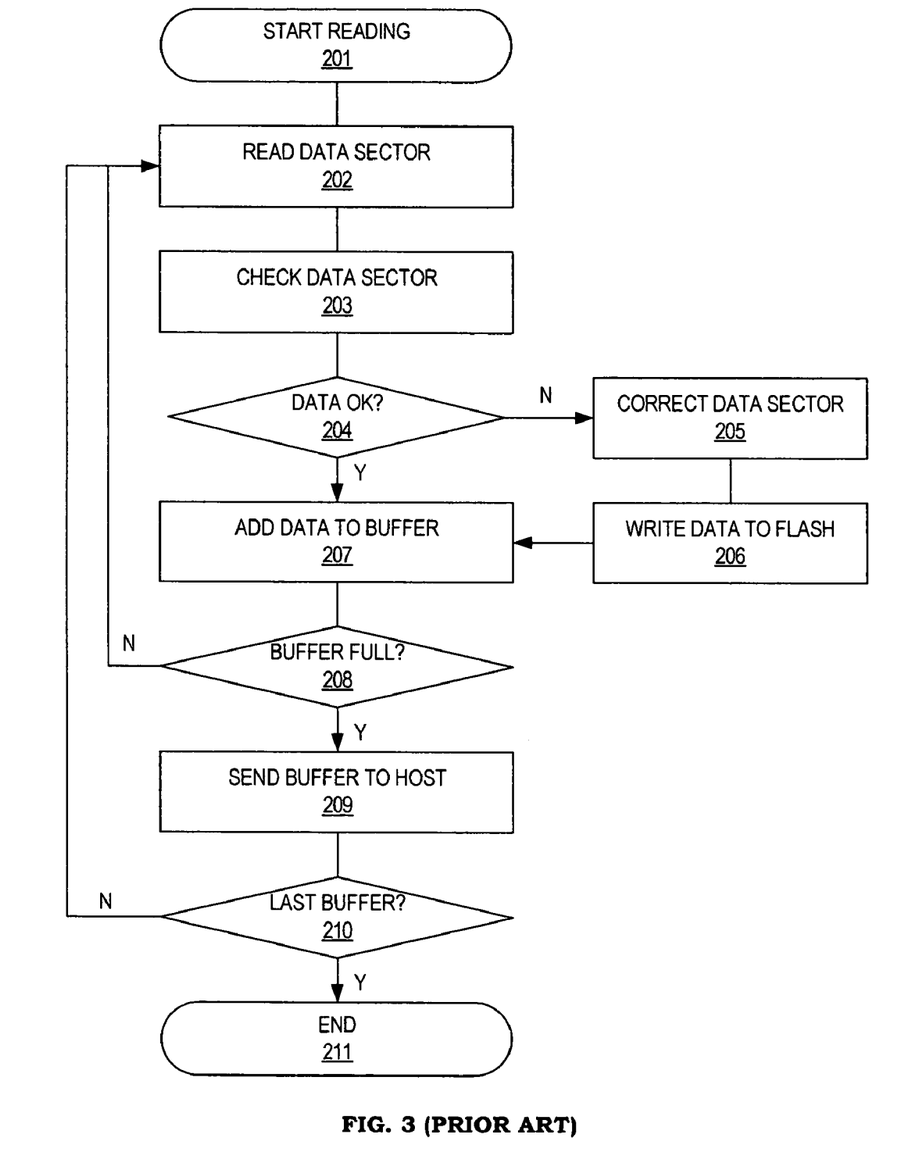
FIG. 3 is a flow diagram of reading data from the prior art flash storage device of FIG. 2.

Reference is now made to FIG. 2 and FIG. 3, which describe a flash storage and processing system 5 according to the prior art. Host 20 includes host functions 110, for example all components and software of a personal computer, and the host side of interface 105, for example a USB interface, for exchanging data with flash storage device 30. Flash storage device 30, which is the prior art embodiment of flash storage device 10 of FIG. 1, includes a flash memory 101, a controller 100 to control data flow into and from flash memory 101, and the flash storage device side of interface 105, for example a USB interface. Interface 105 includes buffer 106, preferably a volatile memory, to temporarily store data before transferring the data to host functions 110. Buffer 106 is usually implemented within the host part of interface 105. When interface 105 is a USB interface, the size of buffer 106 is typically 64 kilobytes. The focus of the present invention is on read operations, i.e. transfer of data from flash memory 101 to host functions 110; write functions in the opposite directions are therefore not shown, although such write functions will usually exist. Data in flash memory 101 is stored along with the matching error correction codes (ECC). In a typical embodiment, data in flash memory 101 is organized in sectors of 512 bytes, with added 6 bytes per sector for ECC. Data flow starts by flash memory 101 sending a sector of 512 bytes of data with the associated ECC 121, to controller 100. Controller 100 then compares the ECC to the data content; if an error is found, it is corrected by the error correction algorithm programmed into controller 100, and the corrected data 122 are written back onto flash memory 101 to fix the error. Controller 100 then sends the original data sector (if found correct) or corrected data sector 124 to buffer 106, where the data are accumulated until reaching the buffer size, typically 64 kilobytes, or until the end of data flow 121 from flash memory 101 is detected. Then data 123 representative of buffer 106 content are sent to host functions 110. Data continues to flow this way until completion of the desired data transfer from flash memory 101 to host functions 110.

FIG. 3 is a flowchart that describes in more detail the data flow process, which usually runs under the initiative and control of host functions 110 in cooperation with controller 100. In step 201 reading is commenced. In step 202, a data sector of 512 bytes is read from flash memory 101, and is sent with the associated ECC 121 to controller 100. In step 203, controller 100 checks the content of the data and ECC to determine whether the data need correction. If in step 204 the data is found to contain errors, then in step 205 the data are corrected using the ECC and the error correction algorithm programmed in controller 100, and in step 206 the corrected data are written back to flash memory 101, and then fed to buffer 106 in step 207. If the data were found correct in step 204, then the original sector is fed into buffer 106 in step 207. In step 208 buffer 106 is examined whether buffer 106 is full, i.e. whether the accumulated sectors added to buffer 106 by the previous steps have reached its 64-kilobyte capacity. If the answer is negative, the procedure loops back to step 202 for reading another data sector; otherwise, in step 209 the buffer content 123 is sent to host functions 110, and buffer 106 is cleared. The process loops through step 210 back to step 202 until reaching the last buffer's worth of data, i.e. completing the transfer of the predefined content from flash memory 101 to host functions 110, and then the process is terminated in step 211.

It will be appreciated that in the prior art described above, each and every data sector of 512 bytes is checked in step 203 to determine the validity of the data sector with respect to the associated ECC, prior to the data sector being fed into buffer 106. Thus, even if the great majority of sectors is valid, still checking all sectors slows down the data flow hence the reading process, which is the motive for the present invention.

Figure 4:
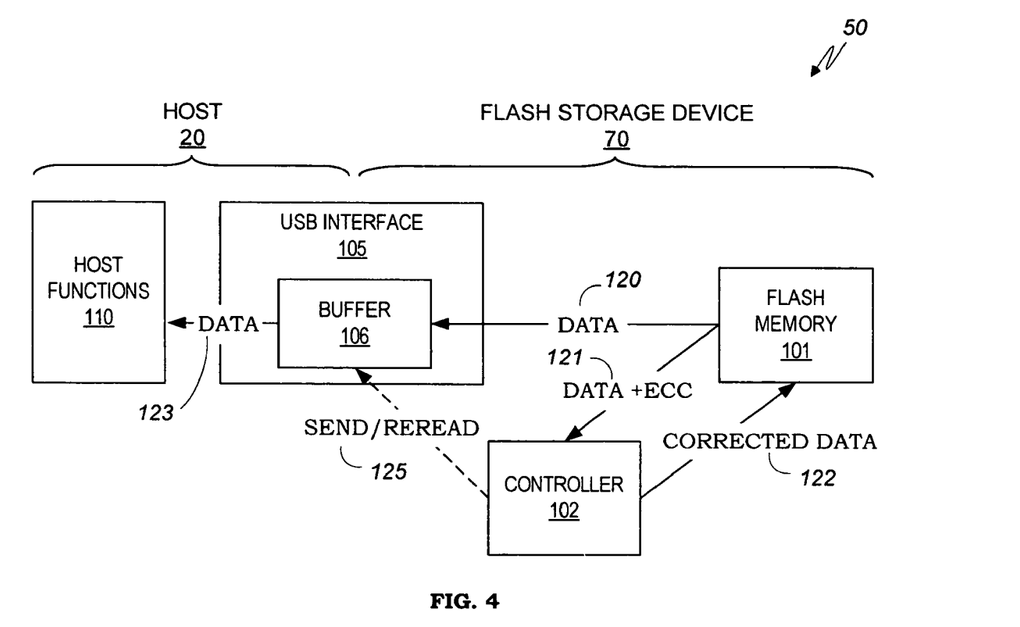
FIG. 4 is a high level conceptual block diagram of a flash storage device of the present invention interfaced with a host.
Figure 5:
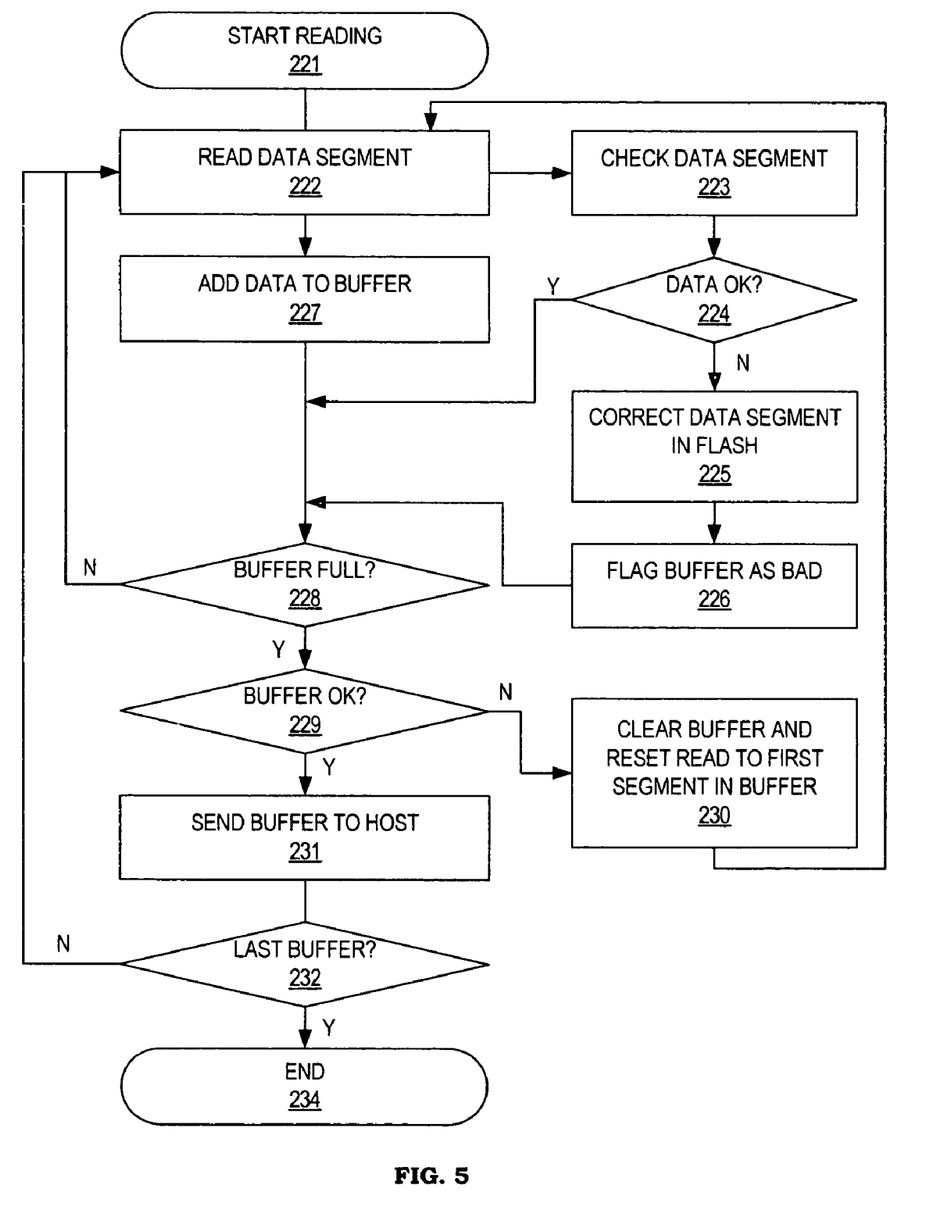
FIG. 5 is a flow diagram of reading data from the flash storage device of FIG. 4.

Reference is now made to FIG. 4 and FIG. 5, which describe a preferred embodiment 50 of the present invention.

Host 20 is as described with respect to FIG. 2. Flash storage device 70 is a preferred embodiment of device 10 of FIG. 1, constructed in accordance with the present invention. Flash storage device 70 allows direct data transfer 120 from flash memory 101 to buffer 106, concurrently with sending that data with the associated ECC 121, to be checked by controller 102, as opposed to checking and correcting the data before sending the data to buffer 106. Direct data transfer 120 is managed by control pulses sent by controller 102 to both flash memory 101 and the flash storage device side of USB interface 105, under methods known to those skilled in the art. A data sector found invalid by controller 102 is corrected and the corrected data 122 are written back onto flash memory 101 as in the prior art described with respect to FIG. 2. In addition, an error flag is set. However the data 120 transferred to the buffer 106 are the data with the error. Buffer 106 continues to receive data even after an error has been detected, until buffer 106 becomes full.

When buffer 106 is filled up to its 64 kilobyte capacity, controller 102 checks whether an error occurred in one of the sectors contained in the buffer 106. If no error occurred, the data in buffer 106 are correct and can be transferred 123 to host function 110. If an error did occur, the entire 64 kilobyte buffer 106 has to be reread from the flash 101, because the data in buffer 106 contain error(s) which were corrected by controller 102 within flash memory 101. To mark whether the data in buffer 106 are valid or should be reread, controller 102 issues a send/reread command 125 at the end of the transfer, according to the state of the error flag. It will be noted that issuing a send/reread control command 125 when buffer 106 is filled-up is common in the art and is part of the USB protocol.

The reading procedure starts in step 221 of FIG. 5, initiated by host functions 110 and executed through cooperation between host functions 110 and flash controller 102. In step 222, a data sector of 512 bytes is read from flash memory 101, along with the respective ECC. Then, concurrently, the procedure is split into step 227 and steps 223-226. In step 227 the data sector 120, excluding the ECC, is added to buffer 106. In step 223 the data and ECC 121 are checked, and if found correct in step 224, the procedure is routed to step 228; if an error was found in step 224, the error is corrected in step 225 by controller 102 applying its error correction algorithm, and the corrected data are written back into flash memory 101; also, in step 226 the content of buffer 106 is flagged bad, and control moves to step 228. In step 228, after completing steps 227 and either 224 or 226, buffer 106 is checked to determine whether the amount of data has reached the capacity of buffer 106, e.g. 64 kilobytes. Note that step 223 optionally can be performed in parallel to reading the next data segment in step 222. If the capacity of buffer 106 has not been reached, the procedure goes back to step 222 to read the next data sector. If buffer 106 is full, then in step 229 the status of buffer 106 is checked. If buffer 106 has been flagged bad at any of the previous steps 226, then buffer 106 and the status flag of buffer 106 are cleared in step 230, the read pointers are reset to the first sector used as the source for the most recent buffer's worth of data, and the procedure moves to step 222, to start reading again the same content, which is the 'reread' option within the send/reread control signal 125 of FIG. 4. If however in step 229 the buffer content is found OK, i.e. no data sector has been found bad in step 224 within that buffer, then in step 231 the content 123 of buffer 106 are sent to host functions 110 and buffer 106 is cleared, as represented by the 'send' option within the send/reread control signal 125 of FIG. 4. Step 232 examines whether the last buffer's worth of data has been reached, i.e. whether the data transfer between flash memory 101 has been completed; if so, the procedure terminates in step 234, otherwise the next data sector is read in step 222. It should be noted that steps 222 and 223 may be implemented as a single read/check step under methods known in the art for error checking by hardware concurrently with the reading process of a data sector. In this case, block 222 is replaced by a combined block 222+223 with read/check functions, and from there concurrent flow is split to blocks 227 and 224.

It should be noted that when errors are rare, the procedure of the present invention described in FIG. 5 is faster than the prior art procedure of FIG. 3, because data are checked in step 223 in parallel with the same data being added to buffer 106 in step 227, whereas in FIG. 3 steps 203 and 207 are effected serially. The overall time saving is positive if the occurrence of step 230 is rare.

Figure 6:
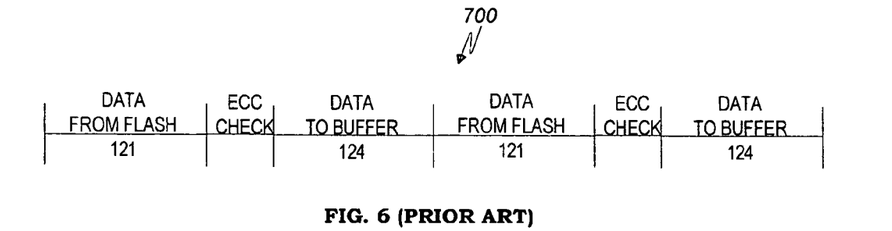
FIG. 6 is a timing diagram for reading data from the prior art flash storage device of FIG. 2.
Figure 7:
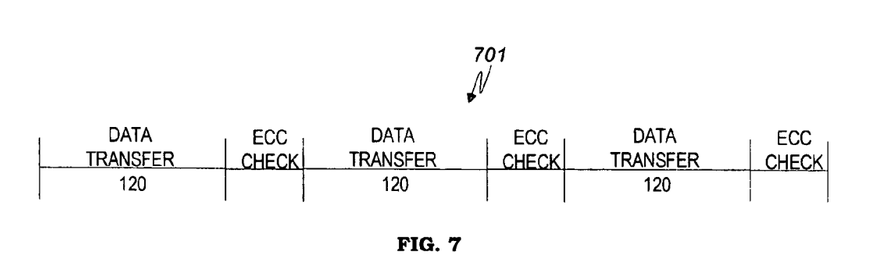
FIG. 7 is a timing diagram for reading data from the flash storage device of FIG. 4.

Reference is now made to FIG. 6 and FIG. 7, which describe timing diagrams of the reading processes in prior art and in the current invention. In FIG. 6, timing diagram 700 describes the processes that take place during the read cycle. First in step 202 of FIG. 3 data are read from the flash (reference numeral 121), then the data are checked for errors in step 203 using the error correction code and then the data are written to the buffer (reference numeral 124) in step 207. In FIG. 7, timing diagram 701 describes the timing of the current invention. The data transfer stage 222 of FIG. 5 transfers data to both buffer 106 and controller 102. Then the data are checked in stage 224 using the error correction code, and a new read can commence. It is clearly visible how the current invention is superior to prior art:

a. The cycle time of reading one sector is almost 50% shorter in 701 than in 700, because there is only one data transfer stage per sector.

b. The data buses of flash memory 101 and interface 105 are almost 100% busy in 701, because most of the time is spent in the data transfer stage, whereas in 700 the data buses are less than 50% occupied because the bus of interface 105 is active only in the data-to-buffer stage, and the bus of flash memory 101 is active only in the data-from-flash stage.

The above description assumes that the data that are sent to host 20 must be error-free. This usually is the case; but in some applications, the data need not be totally free of errors. For example, if system 50 is a video camera, a small number of errors may be tolerable in data retrieved from flash storage device 70 in order to support a sufficiently fast frame refresh rate in a display of the data in host 20. In such a case, in step 224 the number of errors found in the data is compared to a predetermined threshold. If the number of errors found in the data is greater than or equal to the predetermined threshold then program flow continues to step 225; otherwise, program flow continues to step 228. The "usual" case described above is the special case of the threshold being set equal to 1.

Embodiment 70 of a data storage device of the present invention, as illustrated in FIG. 4, includes flash memory 101, controller 102 and as much of interface 105 as is included in flash storage device 70. For example, in some implementations of host 20 and flash storage device 70, buffer 106 is in host 20; in other implementations of host 20 and flash storage device 70, buffer 106 is in flash storage device 70. In addition to managing the reading of data from flash memory 101 as described above, controller manages the general operation of flash memory 101, for example as described in U.S. Pat. Nos. 5,404,485, 5,799,168, 5,937,425 and 6,148,354, all four of which are incorporated by reference for all purposes as if fully set forth herein. It should be noted that the partition of flash storage device 70 among the illustrated components is conceptual and is not intended to indicate that the illustrated components are preferably are discrete components. Usually, in fact, controller 102 and much of the part of interface 105 that is included in flash storage device 70 all are fabricated in a common integrated circuit.

While the invention has been described with respect to a limited number of embodiments, it will be appreciated that many variations, modifications and other applications of the invention may be made.

What is claimed is:

1. A method of sending data from a memory to a host, comprising the step of:
   (a) substantially simultaneously:
      (i) sending the data from the memory to an interface with the host; and
      (ii) sending the data from the memory to a controller to be checked for errors;
   (b) subsequent to said sending of the data from the memory to said interface and to said controller, checking the data for errors, by said controller;
   (c) if no errors are found by said checking then sending the data from said interface to the host: and
   (d) if errors are found and a number of said errors is less than a predetermined threshold then sending the data from said interface to the host, otherwise if the number of said errors is greater than the predetermined threshold then:
      (i) correcting the data, and
      (ii) writing said corrected data to the memory.

2. The method of claim 1, wherein the data are sent directly from the memory to said interface.

3. The method of claim 1, further comprising the step of:
   (e) sending said corrected data from the memory to said interface.

4. The method of claim 3, wherein said corrected data is sent directly from the memory to said interface.

5. The method of claim 1, wherein the memory is separate from said interface.

6. A method of sending data from a memory to a host, the data being stored in a plurality of segments of the memory, the method comprising the steps of:
   (a) for each segment: substantially simultaneously:
      (i) sending the data from said each segment to a buffer; and
      (ii) sending the data from said each segment to a controller to be checked for errors;
   (b) for said each segment, subsequent to said sending of the data from said each segment to said buffer and to said controller, checking the data from said each segment for errors, by said controller;
   (c) for said each segment, if errors are found by said checking and a number of said errors that is found by said checking is at least as great as a predetermined threshold then:
      (i) setting an error flag,
      (ii) correcting the data that are stored in said each segment, and
      (iii) writing said corrected data to said each segment; and
   (d) if the error flag has not been set then sending the data from the buffer to the host.

7. The method of claim 6, wherein the data are sent directly from said each segment to said buffer.

8. The method of claim 6, wherein said sending of the data from the segments to said buffer is effected until a condition, selected from the group consisting of all the data having been sent to said buffer and said buffer being full, is satisfied.

9. The method of claim 8, wherein said corrected data are sent directly from the segments to said buffer.

10. The method of claim 6, further comprising the step of:
    (e) before repeating the method operations clearing said error flag.

11. A method of sending data from a memory to a host, the data being stored in the memory along with an error correction code, the method comprising the steps of:
    (a) substantially simultaneously:
       (i) sending the data without the error correction code from the memory to a buffer, and
       (ii) sending the data with the correction code from the memory to a controller;
    (b) subsequent to said sending of the data from the memory to said buffer and to said controller, using the error correction code to check the data for errors, by said controller;
    (c) if no errors are found by said checking then sending the data from said interface to the host; and
    (d) if errors are found and a number of said errors is less than a predetermined threshold then sending the data from said interface to the host, otherwise if the number of said errors is greater than the predetermined threshold then:

(i) correcting the data,
(ii) replacing the data in said buffer with said corrected data, and
(iii) writing said corrected data to the memory.

12. The method of claim 11, wherein the data are sent directly from the memory to said buffer.

13. The method of claim 11, wherein said replacing of the data in said buffer with said corrected data is effected by sending said corrected data from the memory to said buffer.

14. The method of claim 13, wherein said corrected data are sent directly from the memory to said buffer.

15. A method of sending data from a memory to a host, respective portions of the data being stored along with respective error correction codes in each of a plurality of segments of the memory, the method comprising the steps of:
 (a) for each segment:
  (i) substantially simultaneously:
   (A) sending the respective data portion of said each segment without the respective error correction code from said each segment to a buffer, and
   (B) sending the respective data portion of said each segment from said each segment to a controller to be checked for errors,
  (ii) subsequent to said sending of the respective data portion of said each segment to said buffer and to said controller, using the respective error correction code of said each segment to check the respective data portion of said each segment for errors, by said controller, and
  (iii) if errors are found by said checking and a number of said errors that is found by said checking is at least as great as a predetermined threshold then:
   (A) setting an error flag,
   (B) correcting the respective data portion of said each segment, and
   (C) writing said respective corrected data to said each segment; and
 (b) if the error flag has not been set then sending the data from the buffer to the host.

16. The method of claim 15, wherein the respective data portion of said each segment is sent directly from said each segment to said buffer.

17. The method of claim 15, wherein said sending of the respective data portion from said each segment to said buffer and said checking of the data for errors are effected until a condition, selected from the group consisting of all the data having been sent to said buffer and said buffer being full, is satisfied.

18. The method of claim 17, wherein said corrected data is sent directly from the segments to said buffer.

19. A data storage device, comprising:
 (a) a memory for storing the data;
 (b) at least part of an interface to a host; and
 (c) a controller operative:
  (i) substantially simultaneously:
   (A) to send the data from the memory to the interface, and
   (B) to receive the data from the memory to be checked for errors,
  (ii) subsequent to receiving the data from the memory, to check the data for errors,
  (iii) if no errors are found by said checking then sending the data from said interface to the host: and
  (iv) if errors are found and a number of said errors is less than a predetermined threshold then sending the data from said interface to the host otherwise if the number of said errors is greater than the predetermined threshold then:
   (A) to correct the data, and
   (B) to write said corrected data to said memory.

20. The data storage device of claim 19, wherein said memory is separate from said interface.

21. A method of sending data from a memory to a host, respective portions of the data being stored along with respective error correction codes in each of a plurality of segments of the memory, the method comprising the steps of:
 (a) for each segment: substantially simultaneously:
  (i) sending the respective data portion of said each segment without the respective error correction code from said each segment to a buffer, and
  (ii) sending the respective data portion of said each segment with the respective correction code from said each segment to a controller to be checked for errors;
 (b) for said each segment, subsequent to said sending of the respective data portion of said each segment to said buffer and to said controller, using the respective error correction code of said each segment to check the respective data portion of said each segment for errors, by said controller;
 (c) for said each segment, if errors are found by said checking and a number of said errors that is found by said checking is at least as great as a predetermined threshold then:
  (i) setting an error flag,
  (ii) correcting the respective data portion of said each segment, and
  (iii) writing said corrected data to said each segment, and
 (d) if the error flag has not been set then sending the data from the buffer to the host.

22. A method of sending data from a memory to a host, the data being stored in the memory along with an error correction code, the method comprising the step of:
 (a) substantially simultaneously:
  (i) sending the data without the error correction code from the memory to an interface with the host; and
  (ii) sending the data with the error correction code from the memory to a controller to be checked for errors;
 (b) subsequent to said sending of the data from the memory to said interface and to said controller, checking the data for errors, by said controller;
 (c) if no errors are found by said checking then sending the data from said interface to the host; and
 (d) if errors are found and a number of said errors is less than a predetermined threshold then sending the data from said interface to the host otherwise if the number of said errors is greater than the predetermined threshold then:
  (i) correcting the data, and
  (ii) writing said corrected data to the memory.

23. A data storage device, comprising:
 (a) a memory for storing the data along with an error correction code;
 (b) at least part of an interface to a host; and
 (c) a controller operative:
  (i) substantially simultaneously:
   (A) to send the data without the error correction code from the memory to the interface, and
   (B) to receive the data from the memory to be checked for errors, (ii) subsequent to receiving the data from the memory, to check the data for errors,
(iii) if no errors are found by said checking then sending the data from said interface to the host; and
(iv) if errors are found and a number of said errors is less than a predetermined threshold then sending the data from said interface to the host, otherwise if the number of said errors is greater than the predetermined threshold then:
(A) to correct the data, and
(B) to write said corrected data to said memory.

* * * * *